US006921241B2

United States Patent
Rogers

(10) Patent No.: US 6,921,241 B2
(45) Date of Patent: Jul. 26, 2005

(54) MULTI-PURPOSE LOG HANDLING TOOL

(76) Inventor: Dennis Rogers, 182 S. Paul Rd., St. Mary's, PA (US) 15857-3428

( * ) Notice: Subject to any disclaimer, the term of this patent is extended or adjusted under 35 U.S.C. 154(b) by 0 days.

(21) Appl. No.: 10/241,043

(22) Filed: Sep. 11, 2002

(65) Prior Publication Data

US 2004/0047717 A1 Mar. 11, 2004

(51) Int. Cl.$^7$ ................................................. E02F 3/627
(52) U.S. Cl. ........................ 414/703; 414/920; 212/255
(58) Field of Search .............................. 414/703, 920; 294/118; 212/261, 259, 255

(56) References Cited

U.S. PATENT DOCUMENTS

| | | | |
|---|---|---|---|
| 2,520,722 A | | 8/1950 | Irrer |
| 2,566,616 A | | 9/1951 | Larson |
| 4,067,471 A | * | 1/1978 | Roatcap ...................... 414/703 |
| 4,364,700 A | * | 12/1982 | Arabshian et al. .......... 414/703 |
| 5,061,150 A | | 10/1991 | Rentschler |
| 5,065,984 A | * | 11/1991 | Hake et al. .................. 294/118 |
| 5,178,505 A | * | 1/1993 | Smith .......................... 414/703 |
| 5,405,238 A | | 4/1995 | Samsel, Jr. |
| 5,564,887 A | | 10/1996 | Brooks |

* cited by examiner

Primary Examiner—Donald W. Underwood
(74) Attorney, Agent, or Firm—Miller Law Group, PLLC

(57) ABSTRACT

A multi-purpose log-handling tool for attachment to the three-point hitch of a tractor or other vehicle includes a boom and an inverted U-shaped frame containing a number of apertures to which accessory tools may be attached. The boom and the frame are connected to the tractor and at one of the apertures to permit the outer end of the boom to be lowered and raised by an operator controlling one or more hydraulic pistons. The apertures are preferably longitudinally arranged along a flange affixed to the bottom of the boom. Multiple apertures permit the simultaneous use of more than one tool, which might include logging tongs, chains, or winches. A flexible assembly for coupling the boom to the hydraulic piston accommodates for skewing action as a log is dragged and thereby reduces potential for damage to the log-handling tool.

13 Claims, 2 Drawing Sheets

MULTI-PURPOSE LOG HANDLING TOOL

BACKGROUND OF THE INVENTION

Many individuals own relatively small timber tracts from which logs may be harvested for personal use or for sale in small quantities. Professional logging equipment is not satisfactory for use in such tracts, not only because of excessive cost, but also because of its complexity and size, which routinely demands highly skilled operators. Professional logging equipment also tends to be highly specialized, limiting the use of each piece of equipment to a specific function and requiring multiple pieces of equipment for a complete logging operation. The smaller tract owner needs equipment that is versatile, easy to install, remove and use, and able to be operated by as few as one or two operators without specialized skills.

The present invention relates to the field of log handling, and more particularly to lifting and towing logs behind a tractor.

BRIEF DESCRIPTION OF THE PRIOR ART

The prior art includes many three-point hitch devices that may be attached to a tractor for dragging and lifting logs. U.S. Pat. No. 2,566,616 to Larson describes such a device having a three-point hitch and a pair of lifting tongs suspended within a semi-circular frame. Variations of the three-point hitch design are shown in U.S. Pat. No. 5,061,150 to Rentschler, U.S. Pat. No. 5,564,887 to Brooks, and U.S. Pat. No. 5,405,238 to Samels, Jr. All of the prior art devices perform the basic functions of lifting and dragging a log, yet they suffer somewhat from a lack of versatility. For example, the prior art devices provide inadequate solutions if more than one log is to be dragged at a time, or if it is necessary to move a log temporarily for the purpose of establishing a more secure grip on the log.

SUMMARY OF THE INVENTION

The present invention relates to a multi-purpose log handler that attaches to a three-point hitch of the type found on most conventional farm tractors. The log handler includes a boom and U-shaped frame connected to the tractor such that hydraulic pistons will raise and lower the boom under operator control. The particular configuration of the boom and U-shaped frame optimizes the load-carrying capacity of the structure in relation to stress applied.

A flange solidly affixed to the boom at its outer end (relative to the tractor) includes a plurality of apertures to which the U-shaped frame and accessory tools may be attached. The multiple accessory attachment points permit a high level of flexibility in choosing the right combination of attachments for a given task.

Accordingly, it is an object of the invention to optimize the combination of tools available for a particular log handling task.

It is also an object to permit the selection of more than one tool for use at the same time.

It is a further object to provide maximum versatility in a simple and easy to operate log handling tool.

It is a still further object to provide a strong, yet relatively light weight log handling tool having minimal moving parts.

A log handling apparatus having these and other advantages and that may be attached to a tractor having a three point hitch, the hitch having two lower attachment points and an upper attachment point, includes: (a) a boom having a first end rotatably attached to the upper attachment point and having a second end with two or more apertures arranged longitudinally along the boom; and (b) a frame rotatably secured to the lower attachment points and means for rotatably securing the frame to the boom at a first aperture.

BRIEF DESCRIPTION OF THE DRAWINGS

Other objects and advantages of the invention will become apparent from a study of the following specification when viewed in light of the accompanying drawings, in which.

BRIEF DESCRIPTION OF THE PREFERRED EMBODIMENT

Figure 1:
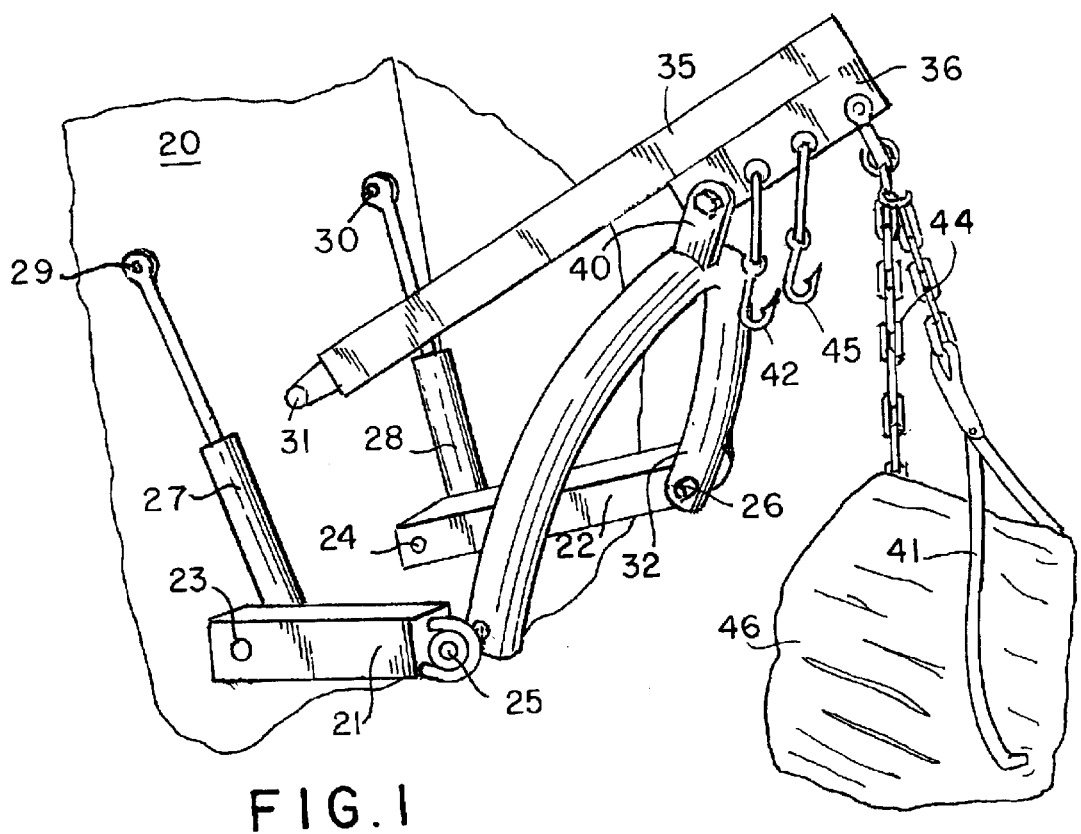
FIG. 1 is a perspective view of the multi-function log-handling apparatus embodying the invention and attached by a three-point hitch to the back of a tractor.
Figure 2:
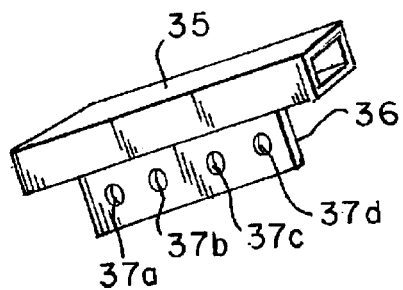
FIG. 2 illustrates the attachment-supporting flange of FIG. 1 without accessories.

Referring first to FIGS. 1 and 2, a tractor 20 has a well-known utility hitch, generally referred to as a three-point hitch, to which accessory devices may be attached. Lever arms 21 and 22 are rotatably attached to tractor 20 by couplings 23 and 24 respectively. They protrude outwardly behind tractor 20 and terminate in coupling points 25 and 26 respectively. A first hydraulic cylinder 27 is rigidly attached to lever arm 21 and also to the tractor at a coupling 29. A second hydraulic cylinder 28 is rigidly attached to lever arm 22 and also to the tractor at a coupling 30. Couplings 25, 26, and 31 provide the three connection points of the three-point hitch. The hydraulic cylinders 27 and 28 are driven by the tractor engine and are operable by the tractor operator.

An inverted U-shaped frame 32 is pivotally connected at its lower ends to couplings 25 and 26 to allow free rotation of frame 32 about the pivot points. One end of a boom 35 is pivotally connected to coupler 31 to permit free rotation of the boom about the coupler as hydraulic pistons 27 and 28 extend and retract. The opposite end of boom 35 includes a rigidly attached flange 36 having a plurality of holes 37a–d as shown in FIG. 2. The number of holes may vary, but four holes have been found to significantly enhance the versatility of the invention and are illustrated as a preferred embodiment. A flange 40 secured to the top center of U-shaped frame 32 has a hole that can be lined up with hole 37a of flange 36. A bolt and nut pivotally secures flange 40 to flange 36, thereby securing U-shaped frame 32 to boom 35.

Log tongs 41, as are well known in the prior art, are preferably secured to the outermost hole 37d of flange 36. The inner holes 37b and 37c preferably support conventional chain hooks 42 and 45, to which other accessory equipment may be attached as needed. A length of chain 44 permits an operator to manipulate a log 46 for added maneuverability of the log tongs 41. For example, as a log is dragged over rough terrain such as in a wooded environment, it is likely to roll back and forth and become snagged against obstacles. Chain 44 permits an operator to manually move the log sideways to avoid obstacles in such situations. It will be readily understood by one skilled in the art that any of the accessories described above, as well as others that are not explicitly identified herein, may be positioned at any of the holes in flange 36.

FIG. 1 illustrates how effectively the invention performs the simple operation of grasping a log with the tongs and lifting it for towing. For a log 46 that is in a relatively exposed location with no significant brush growing around it, tractor 20 needs only to be backed up to the log and the boom 35 lowered into position over the log. It should be noted that the position of the pivot point defined by hole 37a for attachment of frame 32 is closer to the center of boom 35 than is the attachment point at hole 37d for log tong 41. This permits a significantly greater range of upward and downward motion of the tongs for proper adjustment than would be the case if the pivot point for both frame 32 and tongs 41 were co-located along the boom 35.

Figure 3:
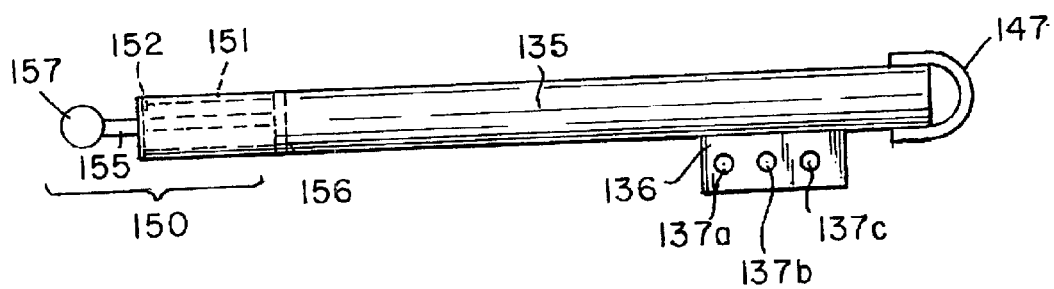
FIG. 3 is an alternative embodiment of an upper support member.

FIG. 3 shows an alternative embodiment of boom 135. Flange 136 may contain a smaller number of holes 137a–c, than is shown in the embodiment of FIG. 1. A clevis 147 is attached to the outermost end of boom 135. The attachment may be either by welding or by a pin or bolt extending through the boom. As was previously described with respect to FIG. 1, the U-shaped frame will be secured to the innermost hole 137a on the flange, with the other holes 137b and 137c, as well as clevis 147, available for securing logging tongs 41 or other accessory devices. It is desirable that there be some limited motion, i.e., skewing, permitted between coupling 31 and boom 135. An effective way to achieve this is with an assembly 150 constructed as follows. A pipe 151 having an outer diameter that fits loosely within boom 135 is welded to an end cap 152 having the same diameter as boom 135. End cap 152 has a hole just large enough to accept a rod 155 having an outer diameter that fits loosely within pipe 151. One end of rod 155 is welded to an end cap 156, the diameter of which is the same as the outside diameter of pipe 151. Construction of assembly 150 proceeds with insertion of rod 155 through pipe 151 and end cap 152 until end cap 156 abuts end of pipe 151. The assembly is inserted into boom 135 and end cap 152 is welded to the end of boom 135. Coupling 157 is welded onto the end of rod 155. The result is a strong, yet not completely rigid, connection between boom 135 and piston 30 that significantly reduces the potential for damage to the log-handler as logs are being dragged.

Figure 4:
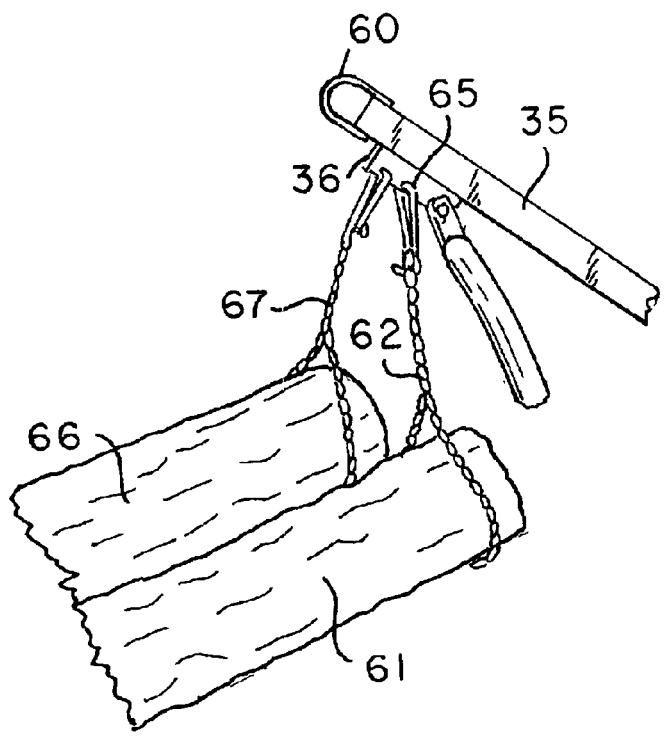
FIG. 4 is a perspective view of an embodiment of the invention utilizing two tools simultaneously.

FIG. 4 shows the invention configured for dragging two logs simultaneously. A logging tong (not shown) secured to clevis 60 may be used to lift a first log 61 above the ground so a chain 62 may be wrapped around it and secured to flange 36 by a shackle 65 or similar connector. The logging tongs may then be used to lift a second log 66 above the ground so a chain 67 may be wrapped around it and secured to flange 36 by a shackle.

Figure 5:
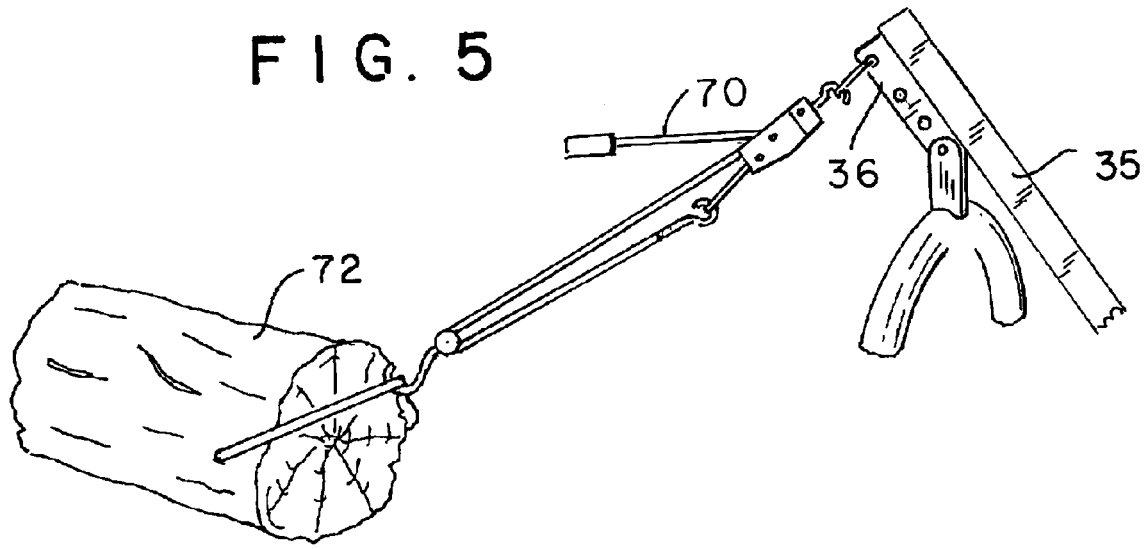
FIG. 5 is an alternative perspective view of an embodiment of the invention in operation.

FIG. 5 shows the invention configured for moving a log that cannot be accessed directly by the end of the tractor due to an obstruction, such as a tree or ditch. A "come-along" 70 or other winch device may be secured to flange 36 to permit movement of a log 72 sufficiently so that it may be moved beyond the obstruction. Thereafter, the log may be handled as previously described.

The versatility of the invention permits a wide variety of logging operations limited only by the imagination of the operator. For example, it permits a log to be grasped at its center for rotation and stacking. Similarly, the invention may be efficiently used for cutting a log into firewood by lifting it at a first end, placing a log at approximately the center of the log to act as a fulcrum, and lowering the first end to raise the second end for cutting.

While the preferred forms and embodiments of the invention have been illustrated and described, it will be apparent to those of ordinary skill in the art that various changes and modifications may be made without deviating from the inventive concepts set forth above. For example, the invention may be used for handling many items other than logs, including railroad ties, telephone poles, light poles, etc. Also, many types of vehicles other than tractors could be fitted with a three point hitch for use with the invention.

What is claimed is:

1. A log handling apparatus for attachment to a tractor having a three point hitch, the hitch having two lower attachment points and an upper attachment point, comprising:

a boom having a first end rotatably attached to the upper attachment point and having a distal second end;

a flange affixed to said boom and being formed with at least two apertures arranged longitudinally along the boom;

a frame rotatably secured to the lower attachment points and connected to said boom at an intermediate point between said first and second ends such that at least one of said apertures is located between said intermediate point and said distal second end; and a log-supporting device detachably mounted on said boom and supportable from at least one of said apertures such that said boom will support a log adjacent said frame opposite said three-point hitch, said boom being operable to support a log-supporting device from said at least two apertures such that said log handling apparatus can engage multiple logs simultaneously.

2. The log handling apparatus of claim 1 wherein said intermediate point coincides with a first of said apertures closest to said first end.

3. The log handling apparatus of claim 2 wherein said intermediate point is closer to said second end than said first end.

4. The log handling apparatus of claim 3 wherein each said log-supporting device is a chain.

5. In a log handling apparatus for attachment to a three-point hitch apparatus to affect generally vertical movement of said log handling apparatus, said three-point hitch including two lower attachment points and an upper attachment point, the improvement comprising:

a frame mounted on said lower attachment points so as to be vertically movable with said three-point hitch apparatus, said frame supporting a boom connected to said first attachment point and projecting outwardly from said frame and away from said three-point hitch apparatus, said boom having a flange affixed thereto outwardly from said frame, said flange having formed therein a plurality of apertures for the mounting of at least one log-supporting device such that said boom will support a log adjacent said frame opposite said three-point hitch apparatus, said flange being operable to support a log-supporting device from each of said apertures so that said log handling apparatus can engage multiple logs simultaneously.

6. The log handling apparatus of claim 5 wherein said frame is pivotally connected to said boom at an intermediate point between said upper attachment point and a distal end of said boom.

7. The log handling apparatus of claim 6 wherein said flange is affixed to an underside portion of said boom between said intermediate point and said distal end.

8. The log handling apparatus of claim 7 wherein said intermediate point corresponds to a first of said apertures located most distant form said distal end.

9. The log handling apparatus of claim 7 wherein said log-supporting device includes a chain supported from a corresponding one of said apertures.

10. The log handling apparatus of claim 9 wherein said flange is operable to mount a plurality of said log-supporting devices, including a chain supported from said at least two apertures.

11. A log handling apparatus for mounting on a three-point hitch mechanism of a prime mover, said three-point hitch mechanism including a pair of lower links and an upper attachment point, said prime mover being operable to vertically move said three-point hitch mechanism, comprising:

a frame mounted on said lower links and being oriented generally vertically therefrom, said frame being coupled to a boom;

said boom being connected to said upper attachment point and projecting rearwardly from said frame, away from said three-point hitch mechanism, to support a log adjacent said frame and rearwardly thereof;

a flange affixed to said boom and having formed therein a plurality of apertures, said apertures being located rearwardly of said frame; and at least one log-supporting device mounted to said flange through a corresponding one of said apertures, said log-supporting device being engagable with a log to permit a vertical movement thereof with the corresponding operation of said three-point hitch mechanism.

12. The log handling apparatus of claim 11 wherein said frame is connected to said flange at a one of said apertures most distant from a distal rearward end of said boom.

13. The log handling apparatus of claim 12 wherein said log-supporting device includes a chain supported on said flange from a corresponding one of said apertures.

* * * * *